Feb. 21, 1967 C. P. JAMIESON 3,305,405
GRAPHITE THERMOCOUPLES AND METHOD OF MAKING
Filed July 17, 1963
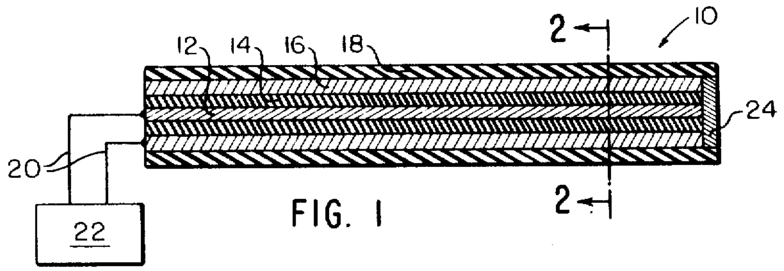
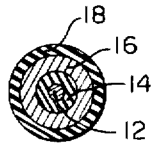
FIG. 1 FIG. 2
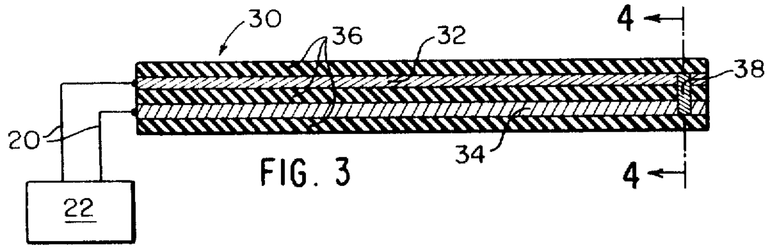
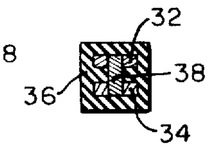
FIG. 3 FIG. 4
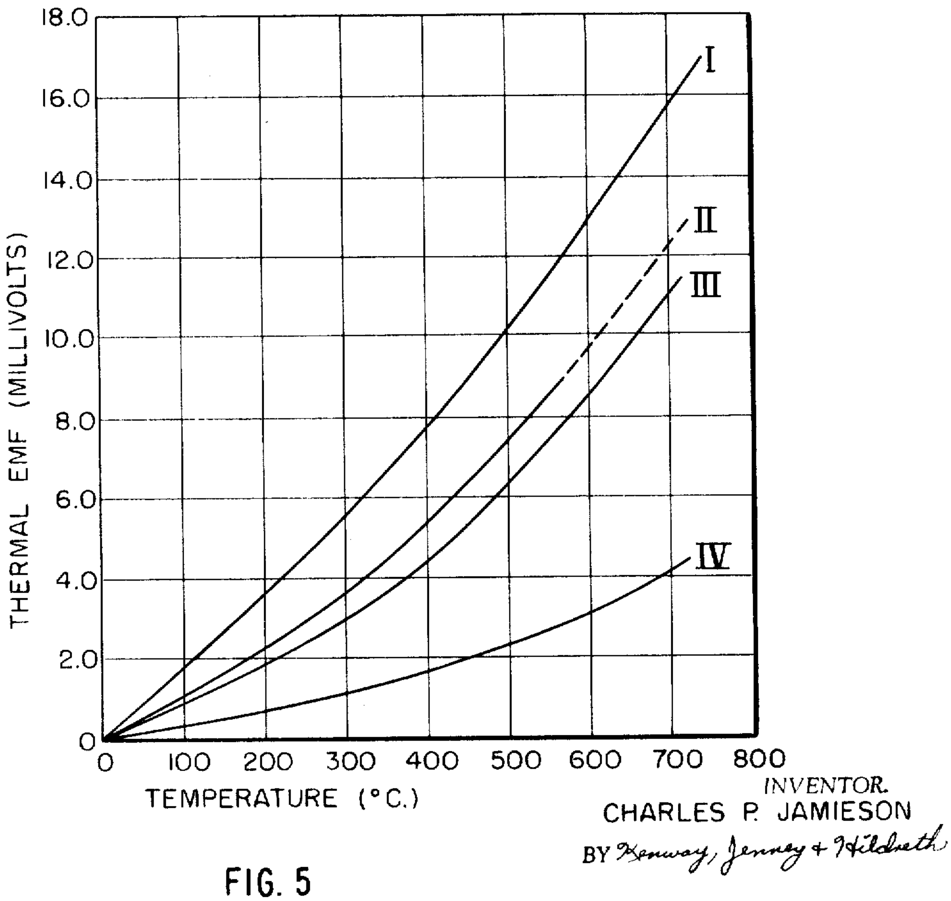
FIG. 5
INVENTOR.
CHARLES P. JAMIESON
BY Kenway, Jenney & Hildreth
ATTORNEYS United States Patent Office 3,305,405

Patented Feb. 21, 1967

3,305,405
GRAPHITE THERMOCOUPLES AND METHOD OF MAKING

Charles P. Jamieson, Cambridge, Mass., assignor, by mesne assignments, to the United States of America as represented by the Secretary of the Air Force Filed July 17, 1963, Ser. No. 295,702
4 Claims. (Cl. 136—232)

My invention concerns thermocouples, and in particular thermocouples having elements of pyrolytic graphite of different thermoelectric characteristics, which thermocouples are capable of measuring high temperatures.

Thermocouples of non-metallic elements having a high strength to weight ratio and capable of measuring temperatures of from 2000° C. to 2500° C. or higher are desirable as high temperature and space vehicle acceleration sensors.

Accordingly it is an object of my invention to provide a thermocouple capable of measuring high temperatures.

Another object of my invention is to provide a nonmetallic thermocouple which has good structural strength and high resistance to thermal shock and stresses.

Further objects and advantages of my invention will be apparent to those skilled in the art from the following detailed description of my invention taken in conjunction with the accompanying drawings wherein:

FIGURE 1 is a cross-sectional and diagrammatical view of a thermocouple of my invention, FIGURE 2 is a sectional view along line 2—2 of the thermocouple of FIGURE 1, FIGURE 3 is a cross-sectional and diagrammatical view of another thermocouple embodiment of my invention, FIGURE 4 is a sectional view along line 4—4 of the thermocouple of FIGURE 3, FIGURE 5 is a graphical illustration of thermal electromotive force versus temperature of various pyrolytic graphites.

I have discovered that non-metallic thermocouples having uniform properties along the thermocouple length, excellent structural strength, and having enhanced resistance to thermal shocks and stresses can be obtained by employing thermoelectric elements composed of pyrolytic graphite having dissimilar thermoelectric characteristics. In particular the vapor deposition from a carbonaceous-containing gas of pyrolytic graphite having different thermoelectric properties for each thermoelectric element provides a thermocouple element of high anisotropic character, and capable of measuring temperatures of over 2000° C. More particularly the employment of pyrolytic graphite varying in deposition and heat treatment history, and therefore in electrical conductive characteristics in conjunction with a boron nitride insulating and protective layer provides a means of measuring high temperatures in corrosive atmospheres. My thermocouples can be easily prepared by the successive vapor deposition of pyrolytic graphite and boron nitride in relatively thin layers.

The preparation of thermocouples of pyrolytic graphite of different thermoelectric properties enables the thermoelectric elements to have a higher degree of purity than commercial graphite, and to have more uniform properties along the length of the pyrolytic graphite elements. Additionally the greater similarity and lower coefficients of thermal expansion of the two graphite elements greatly reduces inherent thermal stresses. The coefficient of thermal expansion of boron nitride is also low and similar to that of pyrolytic graphite which enables vapor deposited layers of graphite and boron nitride to be resistant to repeated thermal shocks such as heating and cooling cycles without flaking, cracking or physical degradation of the layers due to unequal thermal expansion and contraction. The employment of pyrolytic graphite rather than commercial graphite provides thermocouples of superior mechanical and structural strength at high temperatures, since the strength to weight ratio of pyrolytic graphite is as much as five times that of normal graphite above 2000° C.

FIGURES 1 and 2 show an axial cross-sectional and schematic illustration of a solid cylindrical type thermocouple of my invention which includes: an elongated composite rod thermocouple 10 having a one end and the other end which includes an inner rod 12 of pyrolytic graphite having certain thermoelectric characteristics due to its prior heat treatment history and inherent crystalline structure; an outer layer of insulating material such as boron nitride 14; an outer layer 16 of pyrolytic graphite having different thermoelectric properties than the rod 12; and an outer protective coating 18 of boron nitride, or other insulating material to protect the thermocouple elements from oxidizing, or corrosive environments. The thermoelectric pyrolytic graphite elements 12 and 16 are connected at the one end through electrical wire or leads 20 to an apparatus 22 such as a potentiometer for converting the electromotive force developed by the thermoelectric elements at varying temperatures into a useful electrical output signal, meter reading, or the like. The other end of the thermocouple 10 is characterized by a rectangular electrically conductive pin 24 which provides electrical contact between the two types of graphites 12 and 16, and defines the position of the thermoelectric junction wherein the temperature is measured. The pin is inset and flush to the one end of the thermocouple, and can be of commercial graphite or other electrical conductive material preferably one compatible with and having a coefficient of thermal expansion similar to the thermoelectric elements 12 and 16. The thermocouple described comprises a solid composite type thermocouple of concentric cylindrical layers of high mechanical strength capable of measuring high temperatures with good resistance to thermal stress.

FIGURES 3 and 4 show an axial cross-sectional and schematic illustration of a solid plate-type thermocouple 30 of my invention which includes: a rectangular shaped elongated composite thermocouple having a one end and another end and comprising two elongated parallel plate thermoelectric elements 32 and 34 composed of pyrolytic graphite of different thermoelectric properties, which elements are separated and surrounded by an insulating material such as boron nitride 36. The one end of the thermocouple 30 has electrical leads 20 from each of the thermoelectric graphite elements to a sensing apparatus 22. Embedded a short distance within and from the other end of the thermocouple 30 is a conductive pin of commercial graphite 38 which forms electrical contact between the pyrolytic graphite elements 32 and 34 and locates the thermoelectric junction of the thermocouple within one end of the thermocouple assembly. The embedded thermoelectric junction is thus protected from corrosive or oxidizing atmospheres and permits longer transient measurements in these atmospheres or at high temperatures of 2000 to 3000° C. to be made. The thermoelectric elements 32 and 34 have the ends of their plates extending flush to the external surface of the other end of the thermocouple for contact with the surface or environment where temperature is to be measured. The highly anisotropic character of these pyrolytic graphite plate elements 32 and 34 permits the outside thermal environment to be rapidly transmitted to the internal thermocouple junction. My invention provides a method of forming thermocouple junctions by pyrolytic deposition of successive layers of electrically dissimilar graphite and boron nitride.

Although my thermocouples have been shown as solid thermocouples it is of course recognized that thermocouples can be prepared having the conventional structure of an inner rod disposed and axially aligned within an outer tubular rod, the inner and outer rod being of different kinds of pyrolytic graphite. These rods may be separated by high temperature electrical insulating metal oxides, carbides, ceramics, air or a vacuum. The outer surface of my thermocouples may have one or more layers of chemically inert refractory metals or other inert protective materials such as clay and the like to provide additional oxidation protection, strength and wear resistance in the atmospheres to which the thermocouples are exposed.

The thermoelectric elements of my invention can be employed in rigid plate form, or as a thin coating layer on a flexible substrate material such as a plastic insulating film such as polyesters, polytetrafluoroethylene and the like, or on cloth, paper, etc. For example one or more of the pyrolytic graphite elements can employ a winding of flexible tape of thickness from 0.002 to 0.010 inch having a thin pyrolytic graphite coating. Additionally pyrolytic graphite may be deposited on a substrate from a carbonaceous gas such as methane or natural gas streams as an adherent coating in varying thicknesses of up to 1 inch. Vapor deposition is accomplished by high temperature pyrolysis at temperatures of about 1900° C. to 3000° C. or more of carbon-containing vapors and the deposition and condensation of the carbon as pyrolytic graphite on a substrate. The deposited pyrolytic graphite may be heat treated at elevated temperatures of 1500° to 3000° C. for varying periods of time such as 1 to 24 hours or more to further alter the electrical and anisotropic properties and structure of the graphite.

If desired the insulating material of boron nitride may also be vapor deposited. Boron nitride has a structure similar to pyrolytic graphite, and similar coefficient of thermal expansion at nearly all temperatures although boron nitride sublimes at about 3000° C. Further boron nitride being very isotropic, and having a high effective resistivity is one of the preferred insulating materials of my thermocouple.

The production of commercial "synthetic" graphite commonly begins with the polymerization of hydrocarbons. In practice, a petroleum coke which is already a polymerized hydrocarbon, is mixed with a coal tar binder and extruded or pressed into appropriate shapes. Carbon in this form is called "green" carbon. The green carbon is then baked to polymerize the pitch hydrocarbon, and continue the polymerization in the petroleum coke. The baked carbon may then be heat treated. If the heat treatment is carried to high enough temperatures the carbon becomes highly graphitized.

In the early stages of polymerization for heat treatments less than 600° C., the carbon is a molecular solid. The energy gap $\Delta E$ between the valence and conduction energy bands is larger i.e. greater than 0.3 ev.; few electrons are excited into the conduction band and the electrical resistivity is very high such as greater than $10^5$ ohm cm. If the molecular solid is heat treated to 900° C. it is converted into raw coke having a crystallite size of between about 15 A. and 25 A. In this raw coke the energy gap $\Delta E$ narrows to about 0.5 ev. to 0.2 ev. and the driving off of hydrogen results in the formation of holes in the valence band, hole conduction predominates, and the Hall coefficient is positive. The electrical resistivity decreases rapidly with increasing heat treatment temperature from about $10^7$ to about 1 ohm cm.

For heat treatments about 900° C. to about 1700° C. the rudimentary graphitization which has already occured is carried much further. The graphite crystallites are now in the range of 25 to 80 A. and are designated as turbostatic crystals. That is, the crystallite is a stack of graphite layers in which each layer is the usual graphite array of hexagonal benzene rings, but the adjacent layers are randomly oriented with respect to each other. As the heat treatment temperature is increased to 1700° C. the energy gap $\Delta E$ ranging from about 0.15 ev. to 0.03 ev. becomes narrower as the crystallite size increases. Electrical resistivity of the baked carbon or calcined coke decreases to about 0.005 ohm cm. The Fermi level also falls below the upper limit of the valence band, that is, the band is not filled. At heat treatment temperatures of from 1700° C. and especially from about 1900° C. to about 2200° C. and higher pyrolytic graphite is formed with the layers in the crystallites, besides growing larger to about 100 to 200 A. or larger in one area, also orienting themselves to produce crystallites with a three dimensional order arrangement. The energy gap becomes narrow to less than about 0.01 ev., the Fermi level rises, and electrical resisitivity decreases to about $10^{-3}$ ohm cm. or less. As the heat treatment temperatures increases still further to 3000° C. the energy bands meet and perhaps overlap and the pyrolytic graphite formed at about 1900° C. becomes virtually metallic in its electronic properties. For certain hydrocarbons the second state of graphitization does not occur for heat treatment temperatures about 2200° C. That is, the crystallites remain turbostatic. These are called "hard" carbons.

Natural graphite as compared to polycrystalline synthetic graphite has very large crystallite size and an electrical resistivity of less than $5 \times 10^{-5}$ ohm cm. Pyrolytic graphite unlike commercial carbon or graphites has no binder material to introduce undesired impurities or inhomogeneities large enough to effect its electronic properties. Further the crystallites are much more randomly oriented in commercial than in pyrolytic graphites, which orientation is inherent in the production of the commercial material. Pyrolytic graphite has a very high degree of anisotropy with regard to thermal (5 to 10 to one) and electrical conductivity (100 to 1000 to one) as measured parallel and perpendicular to surface. Commercial graphite has only moderate anisotropy of about 50 to 60%. The pyrolytic graphite useful as thermoelectric elements of my thermocouple is a polycrystalline form of graphite deposited from a carbonaceous vapor on a substrate at temperatures of above about 1900° C. Pyrolytic graphite so prepared is a dense material, impervious to gases and liquids, is considerably stronger than commercial graphite, and has a higher degree of anisotropy in its electrical and thermal properties than single crystal natural graphite or commercial graphite. Unlike natural graphite the stacking of the layers of pyrolytic graphite is random. The density of pyrolytic graphite is from about 1.8 to 2.22 gm./cm.$^3$ with the density generally increasing with the temperature of deposition. Above 2000° C. where normal graphite has one of the highest strength to weight ratios, pyrolytic graphite such as Pyrographite (a trademark of Raytheon Inc.) has a strength to weight ratio about five times greater than normal graphite. The degree of anisotropy of the electrical conductivity of pyrolytic graphite prepared at about 2000° C. in the direction parallel to the surface as compared to perpendicular to the surface is in the order of 1000 to 1.

Thus it can be seen that commercial graphites and natural graphite fail to possess the unique properties necessary to provide the advantages of my thermocouples.

FIGURE 5 is a graphical representation of experimental data of the thermal E.M.F. in millivolts versus temperature ° C. between various thermoelectric elements of pyrolytic graphite having different deposition and heat treatment histories, and a platinum thermoelectric element. These pyrolytic graphite elements have therefore different crystallite size and thermal electrical properties. The samples designated I through IV were vapor deposited pyrolytic graphite elements.

PRYOLYTIC GRAPHITE THERMOELECTRIC PLATES

| Sample Number | Vapor Depositing Temperature | Heat Treatment |
|---|---|---|
| I | 1,900-2,000° C | None. |
| II | 2,050-2,150° C | Do. |
| III | 2,400-2,500° C | Do. |
| IV | 2,050-2,150° C | 2,700° C. for 3 hours. |

Each curve in FIGURE 5 is a plot of the thermal E.M.F. versus the temperature for a graphite element against a platinum element. In each case the graphite is positive relative to platinum.

Comparison of the curves for samples I, II, and III shows that the thermal E.M.F. of pyrolytic graphite versus platinum decreases with increasing deposition temperature. Comparison of curves for samples II and IV shows that heat treatment of samples to temperatures higher than deposition temperatures also decreases the thermal E.M.F. relative to platinum, that is the graphite elements become almost metallic in thermoelectric properties.

The higher deposition and/or heat treatment temperatures results in larger crystallites. The general correlation between crystallite size and deposition and/or heat treatment temperature is well known. Thermal E.M.F.'s generated between the different graphite elements can be obtained by subtracting the curves of FIGURE 5 from each other. Thus a thermocouple can be prepared as described by employing as dissimilar graphite elements the graphite Samples I and IV.

For example in preparing the pyrolytic graphite/graphite thermocouples of my invention one of the graphite thermoelectric elements can be heat treated to achieve maximum graphitization such as heat treated at over 2000° C. to have thermoelectric properties which approaches metallic conductivity levels as in Sample IV of FIGURE 5. The other graphite thermoelectric element can be then pyrolytically deposited say at 1900° C. or above and heat treated at 2500° C. for a considerable period of time to give an average crystallite size of about 100 A. This graphite element would have a positive Hall coefficient indicating hole conduction and be high anisotropic. A thermocouple can therefore be prepared of electrically dissimilar pyrolytic graphite which would be stable at temperatures of at least 2500° C.

Pyrolytic graphite thermocouples as described possess uniform properties along the thermocouple length, are structurally strong and are capable of measuring high temperatures of above 2000° C. The pyrolytic graphite elements employed are characterized by being high anisotropic, and have large crystallite size and high density.

What I claim is:

1. An elongated thermocouple of high strength having a one end and another end and which includes: first and second thermoelectric elements of pyrolytic graphite which thermoelectric elements are characterized by being dissimilar in thermoelectric elements are characterized by being dissimilar in thermoelectric properties by virtue of a difference in the heat treatment history of the pyrolytic graphite, the elements being separated along the axial length by an insulating material, and having at the one end thereof a thermocouple junction formed by an electrically conductive material in contact with the first and second thermoelectric elements and which thermocouple junction is embedded a short distance from the one end of the thermocouple with the first and second thermoelectric elements separately extending to the temperature exposed end of the thermocouple, and the other end of said thermoelectric elements being in electrical communication with a means for detecting the difference in thermal electromotive force between the thermoelectric elements at the temperatures to which the junction is exposed.

2. A method of preparing a thermocouple which comprises: vapor depoisting at temperatures of above 1900° C., a first and a second pyrolytic graphite thermoelectric element; placing the first and the second graphite elements in electrical communication to provide a thermocouple junction, the first and the second pyrolytic graphite elements having dissimilar thermoelectric characteristics; and vapor depositing boron nitride as an insulating material on each element of dissimilar pyrolytic graphite and between adjacent elements.

3. A high temperature thermocouple having a high shock and stress strength-to-weight ratio for measuring temperatures in the order of 2500° C. and of uniform properties along a thermocouple length and of high anisotropic character and adapted for use in corrosive atmospheres and the thermocouple comprising one end where a temperature is measured remote from an opposite end to which lead wires are connected, a crystalline structure pyrolytic graphite inner rod core extending axially and centrally of the thermocouple, a boron nitride sleeve disposed outwardly of the pyrolytic graphite inner rod core for the length thereof, an outer layer of pyrolytic graphite overlying the boron nitride sleeve along its side remote from the rod core for the length thereof and of different thermoplastic properties than the rod core, a boron nitride outer productive coating overlying the outer layer of pyrolytic graphite for beyond the length thereof, an electrically conductive pin means providing electrical contact between the pyrolytic graphite inner rod and the pyrolytic graphite outer layer at adjacent ends common thereto defining the position of the thermoelectric junction wherein the temperature is measured and the pin means being inset and flush with the boron nitride outer protective coating end overlying the outer layer of pyrolytic graphite beyond the length thereof remote from the thermocouple connecting end, and at the thermocouple connecting end one thermocouple output lead connected to the pyrolytic graphite inner rod and a second thermocouple output lead connected to the pyrolytic graphite outer layer for carrying an electromotive force developed by the thermoelectric elements at varying temperatures as electrical output signals from the thermocouple.

4. The high temperature thermocouple having a high shock and strength-to-weight ratio for measuring temperatures in the order of 2500° C. and of uniform properties along the thermocouple length and of high anisotropic character and adapted for use in corrosive atmospheres and the thermocouple comprising one end where a temperature is measured remote from an opposite end to which lead wires are connected, a rectangular shaped elongated composite thermocouple of two parallel plate thermoelectric elements composed of pyrolytic graphite of different thermoelectric properties, a boron nitride insulating material separating and surrounding the two parallel plate thermoelectric elements of pyrolytic graphite, a conductive pin of commercial graphite making electrical contact between the two pyrolytic graphite parallel elements adjacent to the end of the thermocouple where temperature is measured, and at the thermocouple end to which lead wires are connected one signal output lead having an end connected to one parallel plate thermoelectric element of pyrolytic graphite of one thermoelectric property and a second signal output lead having an end connected to the other parallel plate thermoelectric element for together carrying an electromotive force developed by the parallel plate thermoelectric elements at varying temperatures as electrical output signal from the thermocouple.

(References on following page)

References Cited by the Examiner

UNITED STATES PATENTS

| | | | |
|---|---|---|---|
| 885,430 | 4/1908 | Bristol | 136—5.4 |
| 1,289,116 | 12/1918 | Chubb | 136—5.1 |
| 2,152,153 | 3/1939 | Ridgway | 136—4.9 |
| 2,629,757 | 2/1953 | McKay | 136—5.2 |
| 3,007,989 | 11/1961 | Nicholson et al. | 136—5 X |
| 3,011,006 | 11/1961 | Nicholson et al. | 136—5 |

FOREIGN PATENTS

| | | |
|---|---|---|
| 908,860 | 10/1962 | Great Britain. |

OTHER REFERENCES

Brophy, J. J. et al.: Organic Semiconductors, N.Y., The MacMillan Co., 1962, pages 180–183, 187 and 232–237 only relied upon, Electrical Properties of Pyrolitic Graphites by C. A. Klein.

WINSTON A. DOUGLAS, *Primary Examiner.*

ALLEN B. CURTIS, *Examiner.*